United States Patent
Lin et al.

(10) Patent No.: US 7,527,418 B2
(45) Date of Patent: May 5, 2009

(54) BACKLIGHT MODULE HAVING COLORED REFLECTIVE STRUCTURE AND LIQUID CRYSTAL DISPLAY USING SAME

(75) Inventors: Wen-Bin Lin, Shenzhen (CN); Chih-Hung Chang, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/974,777

(22) Filed: Oct. 16, 2007

(65) Prior Publication Data
US 2008/0089096 A1    Apr. 17, 2008

(30) Foreign Application Priority Data
Oct. 16, 2006    (TW)    .............................. 95138078 A

(51) Int. Cl.
*F21V 7/04*    (2006.01)
(52) U.S. Cl. .................. 362/633; 362/624; 362/231; 349/58; 349/62
(58) Field of Classification Search .................. 362/30, 362/330, 606, 608–613, 632–634, 231, 623–625; 349/58, 61, 62, 65, 68, 70, 75
See application file for complete search history.

(56) References Cited

U.S. PATENT DOCUMENTS

| | | | |
|---|---|---|---|
| 5,186,537 A | 2/1993 | Katoh et al. | |
| 6,174,064 B1 * | 1/2001 | Kalantar et al. | 362/255 |
| 6,508,564 B1 * | 1/2003 | Kuwabara et al. | 362/612 |
| 2002/0109805 A1 * | 8/2002 | Baba | 349/65 |
| 2006/0126359 A1 * | 6/2006 | Yao et al. | 362/615 |
| 2007/0064444 A1 * | 3/2007 | Kim et al. | 362/612 |
| 2007/0064445 A1 * | 3/2007 | Hatanaka et al. | 362/613 |

FOREIGN PATENT DOCUMENTS

JP    08146228 A  *  6/1996

* cited by examiner

*Primary Examiner*—Hargobind S Sawhney
(74) *Attorney, Agent, or Firm*—Wei Te Chung

(57) ABSTRACT

An exemplary backlight module (20) includes a light guide plate (22) having a light incident surface (224), a plurality of light sources (23) adjacent to the light incident surface, a frame (24) for receiving the light sources and the light guide plate, and a colored reflective structure (220) disposed in the frame. Some of the light beams emitting from the light sources are transmitted to the colored reflective structure and converted to reflected light beams having a corresponding color. The reflected light beams further mix with light beams emitting from the light sources and generate light beams in desired color system. A liquid crystal display (200) using the backlight module is also provided.

13 Claims, 5 Drawing Sheets

BACKLIGHT MODULE HAVING COLORED REFLECTIVE STRUCTURE AND LIQUID CRYSTAL DISPLAY USING SAME

FIELD OF THE INVENTION

The present invention relates to backlight modules, and more particularly to a backlight module having a colored reflective structure and a liquid crystal display (LCD) using the backlight module.

GENERAL BACKGROUND

LCDs are widely used in various modern information products, such as notebooks, personal digital assistants (PDAs), video cameras and the like. The wide usage of the LCD is due to its advantages such as portability, low power consumption, and low radiation. LCDs are passive optical devices. Therefore in general, a backlight module is needed to provide sufficient illumination for an LCD panel of the LCD, so as to enable the LCD panel to display images.

Generally, a backlight module includes a light source and a light guide plate (LGP). The LGP is for guiding light beams emitted by the light source, so that the light beams transmit to a predetermined display area. The light source can for example be a cold cathode fluorescent lamp (CCFL) or one or more light emitting diodes (LEDs). A typical LED is small, and light beams emitted by an LED are more focused. Therefore the LED is more suitable for a small sized product, such as an LCD used in a mobile phone, a portable media player, a PDA, or the like.

In general, it is difficult to manufacture a white light emitting diode (WLED) that can emit white light beams with high purity. Typically, light beams emitted by a WLED are slightly yellowish. That is, the light beams are mostly white but also partly yellow. These white-yellowish light beams are liable to reduce the display quality of the LCD. One means employed to convert the white-yellowish light beams to pure white light beams is to use an LGP that has a plurality of colored particles incorporated therein. This solution utilizes principles of colored light mixing to achieve white output light having high purity.

FIG. 5 is an isometric view of a conventional backlight module. The backlight module 10 includes a light guide plate (LGP) 13 and a plurality of light sources 12. The LGP 13 is made by injection molding, and includes a top light emitting surface 132, a bottom surface 133, a light incident surface 131 adjacent to the light emitting surface 132 and the bottom surface 133, and a plurality of embedded colored particles 130. The colored particles 130 are typically blue particles, which are sprayed into a molten LGP preform during the injection molding process. Each of the light sources 12 is a white light emitting diode (WLED). The light sources 12 are disposed adjacent to the light incident surface 131 of the LGP 13.

Light beams emitting from the light sources 12 are transmitted into the LGP 13 via the light incident surface 131, with the light beams being white-yellowish. In the LGP 13, some of the white-yellowish light beams are scattered by the colored particles 130, and converted to blue light beams. The blue light beams mix with other white-yellowish light beams that are not scattered, and accordingly white light beams having high purity are generated. The white light beams emit from the light emitting surface 132 of the LGP 13, and enable an LCD employing the backlight module 10 to display high quality images.

The backlight module 10 solves the need to provide pure white light beams. However, the material of the colored particles 130 is different from that of the LGP 13. Therefore when the colored particles 130 are sprayed into the molten LGP preform, the colored particles 130 block cross-linking of molecular structures of the material of the LGP preform. Thus the structural integrity of the formed LGP 13 is weakened.

It is, therefore, desired to provide a backlight module and an LCD employing the backlight module which can overcome the above-described deficiencies.

SUMMARY

In one aspect, a backlight module includes a light guide plate having a light incident surface, a plurality of light sources adjacent to the light incident surface, a frame for receiving the light sources and the light guide plate, and a colored reflective structure disposed in the frame. Some of the light beams emitting from the light sources are transmitted to the colored reflective structure and converted to reflected light beams having a corresponding color. The reflected light beams further mix with light beams emitting from the light sources and generate light beams in desired color system.

In another aspect, a liquid crystal display includes a liquid crystal panel and a backlight module adjacent to the light crystal panel. Some of light beams emitting from the backlight module is converted to new light beams having a corresponding color by a colored structure. The new light beams further mix with the light beams emitting from the backlight module and generate light beams in desired color system for illuminating the light crystal panel.

Other novel features and advantages of the above-described backlight module and liquid crystal display will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
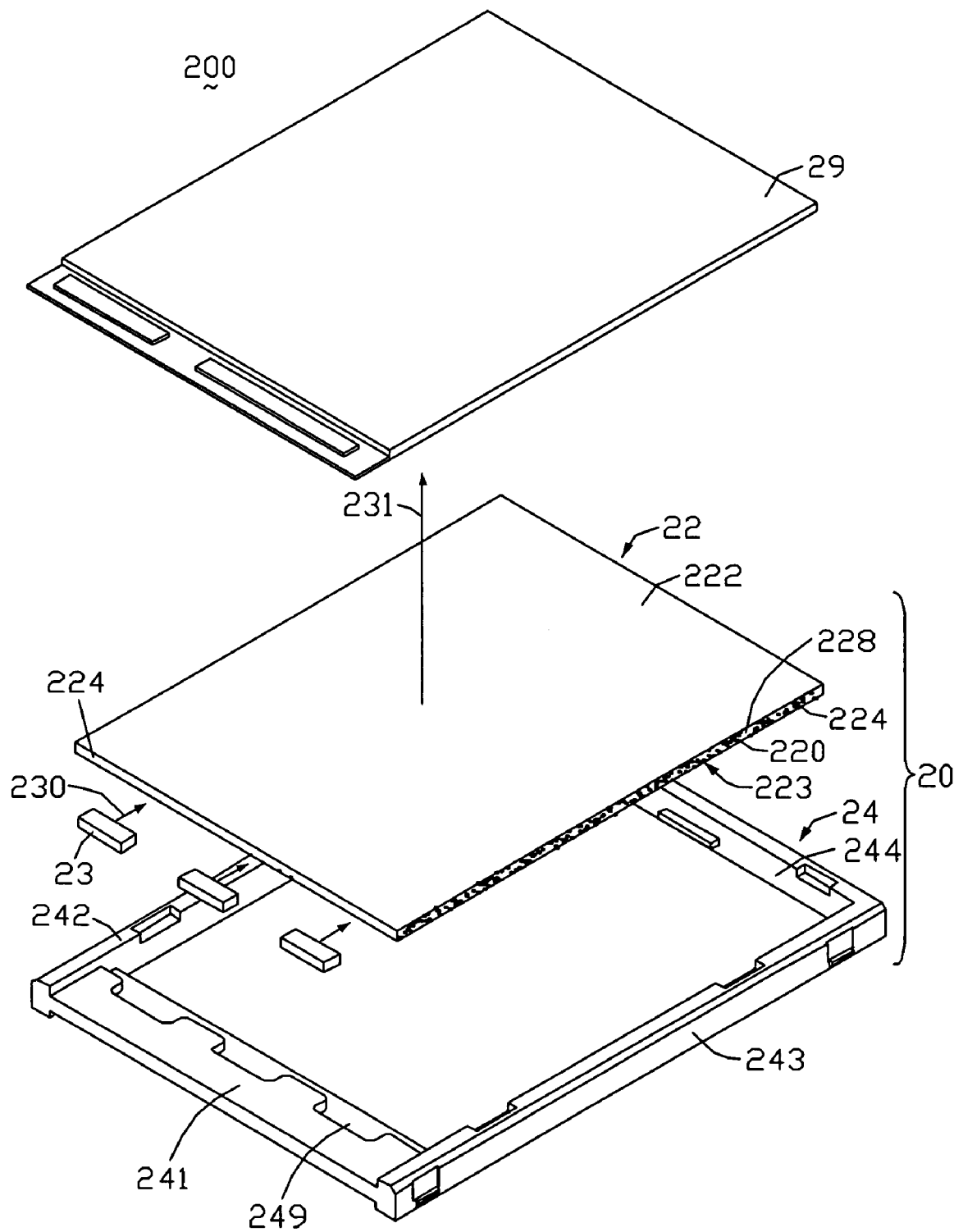
FIG. 1 is an exploded, isometric view of a liquid crystal display according to a first embodiment of the present invention.

FIG. 1 is an exploded, isometric view of an LCD 200 according to a first embodiment of the present invention. The LCD 200 includes a liquid crystal panel 29, and a backlight module 20 that functions as a surface light source to illuminate the liquid crystal panel 29. The backlight module 20 includes a light guide plate (LGP) 22, a frame 24, and three light sources 23. All of the light sources 23 are white light emitting diodes (WLEDs).

The frame 24 includes a first sidewall 241, a second sidewall 244 opposite to the first sidewall 241, a third sidewall 242 adjacent to the first sidewall 241 and the second sidewall 244, and a fourth sidewall 243 opposite to the third sidewall 242. The first sidewall 241, the third sidewall 242, the second sidewall 244, and the fourth sidewall 243 are arranged end-to-end to cooperatively form a four-sided closed structure for containing the LGP 22. Moreover, the first sidewall 241 includes three notches 249, which are configured to contain the three light sources 23.

The LGP 22 is preferably made of polymethyl methacrylate (PMMA), and includes a top light emitting surface 222, a bottom surface 223, and four side surfaces 224 adjacent to both the light emitting surface 222 and the bottom surface 223. One of the side surfaces 224 that is adjacent to the light sources 23 functions as a light incident surface. Each of the other three side surfaces 224 includes a colored reflective layer 220 formed thereon. Each colored reflective layer 220 includes colored reflective material 228, and is applied on the corresponding side surface 224 by painting or coating. Typically, the colored reflective material 228 is particles of blue pigment. The colored reflective layer 220 reflects light beams incident thereto. The color of reflected light beams corresponds to the color of the colored reflective material 228. In this embodiment, the reflected light beams are blue because the colored reflective material 228 is blue pigment particles.

Figure 2:
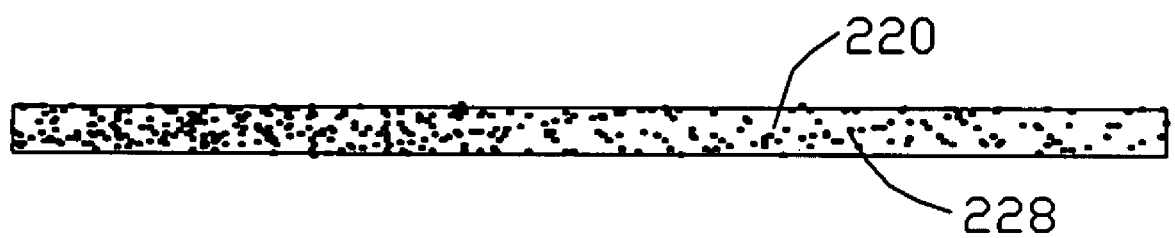
FIG. 2 is an enlarged plan view of part of a colored reflective layer of the liquid crystal display of FIG. 1.

FIG. 2 is an enlarged plan view of the colored reflective layer 220 of one of the side surfaces 224 that is adjacent to the light incident surface 224. The colored reflective material 228 is distributed in the colored reflective layer 220 with a varying distribution density. In particular, the distribution density of the colored reflective material 228 gradually reduces from a first end of the colored reflective layer 220 at the light incident surface 224 to an opposite second end of the colored reflective layer 220 far away from the light incident surface 224. As regards the colored reflective layer 220 of the other side surface 224 that is adjacent to the light incident surface 224, the distribution density of the colored reflective material 228 varies as described above. That is, the distribution density of the colored reflective material 228 gradually reduces from a first end of the colored reflective layer 220 at the light incident surface 224 to an opposite second end of the colored reflective layer 220 far from the light incident surface 224. As regards the colored reflective layer 220 of the other side surface 224 at an opposite side of the LGP 22 to the light incident surface 224, the distribution density of the colored reflective material 228 is uniform.

In assembly of the LCD 200, the LGP 22 is lowered down and arranged in the frame 24, so that the light incident surface 224 faces the first sidewall 241, and the other three side surfaces 224 face the second sidewall 244, the third sidewall 242, and the fourth sidewall 243, respectively. Then each of the light sources 23 is lowered down and contained in the corresponding notch 249 of the first sidewall 241, such that the light sources 23 are held firmly in position adjacent to the light incident surface 224 of the LGP 22. The liquid crystal panel 29 is lowered down and positioned on the assembled backlight module 20.

In operation, light beams 230 emitting from the light sources 23 are transmitted into the LGP 22 via the light incident surface 224, the light beams 230 being white-yellowish. Some of the white-yellowish light beams 230 pass though the LGP 22 and are reflected by the colored reflective material 228 of the colored reflective layers 220. Accordingly, these white-yellowish light beams 230 are converted to blue light beams. The blue light beams mix with other white-yellowish light beams that are not reflected, and accordingly white light beams 231 having high purity are generated. The white light beams 231 emit from the light emitting surface 222 of the LGP 22, so as to illuminate the liquid crystal panel 29. Thereby, the LCD 200 is able to display high quality images.

Because the light sources 23 are disposed adjacent to only one of the side surfaces 224 of the LGP 22, the luminous flux of the white-yellowish light beams 230 within the LGP 22 decreases gradually from the light incident surface 224 to the side surface 224 that is at the opposite side of the LGP 22. Accordingly, the white-yellowish light beams 230 reaching the two side surfaces 224 that are adjacent to the light incident surface 224 gradually decrease in intensity from the first ends of the side surfaces 224 at the light incident surface 224 to the second ends of the side surfaces 224 far from the light incident surface 224. Therefore the gradually reducing distribution density of the colored reflective material 228 in said two side surfaces 224 corresponds to the gradually reducing intensity of the white-yellowish light beams 230. Accordingly, at any given region within the LGP 22, the intensity of the blue (reflected) light beams is proportional to the intensity of the white-yellowish light beams 230. As a result, the mixing of the white-yellowish light beams 230 with the blue light beams is suitably proportioned, so that the white light beams 231 emitting from each portion of the light emitting surface 222 have high purity. Thus, the white light beams 231 emitting from all portions of the light emitting surface 222 can have high purity.

In further and/or alternative embodiments, other means can be employed in order to help ensure that the white light beams 231 emitting from the light emitting surface 222 have high purity. In a first example, for the colored reflective layer 220 at each of the two side surfaces 224 that are adjacent to the light incident surface 224, a thickness of the colored reflective layer 220 gradually reduces from the first end at the light incident surface 224 to the second end far from the light incident surface 224. In a second example, for the colored reflective layer 220 at each of said two side surfaces 224, a reflectivity of the colored reflective material 228 gradually reduces from the first end of the colored reflective layer 220 at the light incident surface 224 to the second end of the colored reflective layer 220 far from the light incident surface 224. In a third example, a colorizing capability of the colored reflective material 228 gradually reduces from the first end of the colored reflective layer 220 at the light incident surface 224 to the second end of the colored reflective layer 220 far from the light incident surface 224.

In summary, the LCD 200 generates the blue reflected light beams via the colored reflective layers 220, and mixes the blue reflected light beams with the white-yellowish light beams 230 so as to generate pure white light beams 230 to illuminate the liquid crystal panel 29. Because the colored reflective layers 220 are disposed on the three side surfaces 224 of the LGP 22, no extra material is sprayed into the LGP prefrom during injection molding of the LGP 22. Therefore the structural integrity of the formed LGP 13 is optimal, so that the LGP 22 can withstand shock or vibration that may be sustained by the LCD 200.

Figure 3:
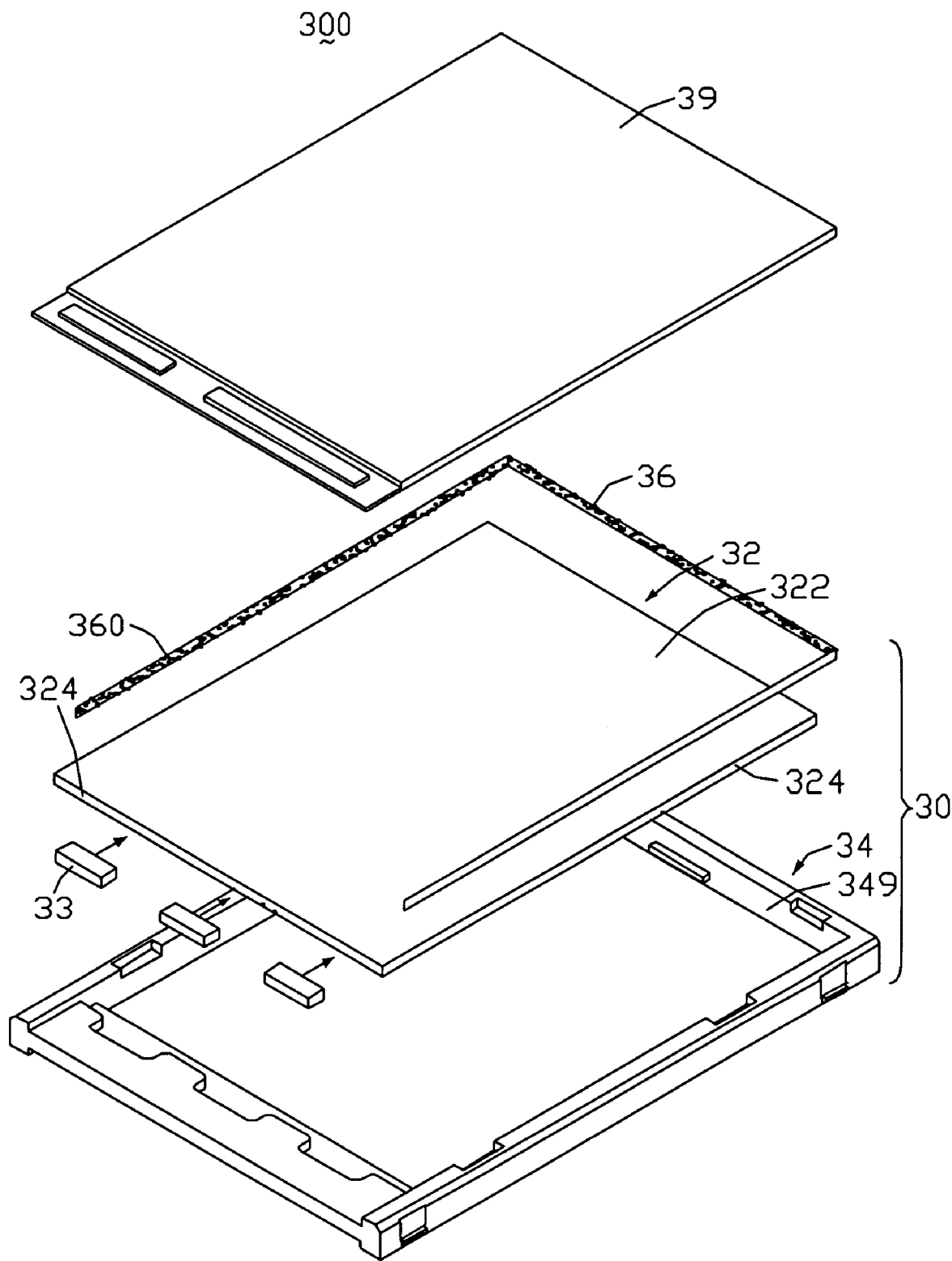
FIG. 3 is an exploded, isometric view of a liquid crystal display according to a second embodiment of the present invention.

FIG. 3 is an exploded, isometric view of an LCD 300 according to a second embodiment of the present invention. The LCD 300 is similar to the above-described LCD 200. However, the LCD 300 includes a liquid crystal panel 39 and a backlight module 30. The backlight module 30 includes an LGP 32, a frame 34, three light sources 33 adjacent to the LGP 32, and a colored reflective film 36. The colored reflective film 36 is U-shaped, and has colored reflective material 360 coated on the inner sides thereof. The structure and function of the colored reflective film 36 are similar to those of the colored reflective layers 220 of the LGP 22 of the LCD 200. The frame 34 includes four sidewalls 349, which are arranged end-to-end to cooperatively form a four-sided closed structure. The LGP 32 includes a top light emitting surface 322, and four side surfaces 324 adjacent to the light emitting surface 322. One of the side surfaces 324 that is adjacent to the light sources 33 functions as a light incident surface.

In assembly, the colored reflective film 36 is lowered down and disposed on or attached to inner surfaces of the corresponding sidewalls 349 of the frame 34. Then the LGP 32 is lowered down and contained in the frame 34, so that the side surfaces 324 except for the one functioning as the light incident surface closely abut the colored reflective film 36. Then the light sources 33 are also lowered down and contained in the frame 34, such that the light sources 33 are held firmly in position adjacent to the light incident surface 324 of the LGP 32. The liquid crystal panel 39 is lowered down and positioned on the assembled backlight module 30.

Light beams emitting from the light sources 33 are transmitted into the LGP 32. Some of the light beams are transmitted to the colored reflective film 36 via the corresponding side surfaces 324 of the LGP 32, and are converted to reflected light beams. The reflected light beams then mix with the light beams that are not reflected, and white light beams having high purity are generated. The white light beams emit from the light emitting surface 322, so as to enable the LCD 300 to display high quality images.

Figure 4:
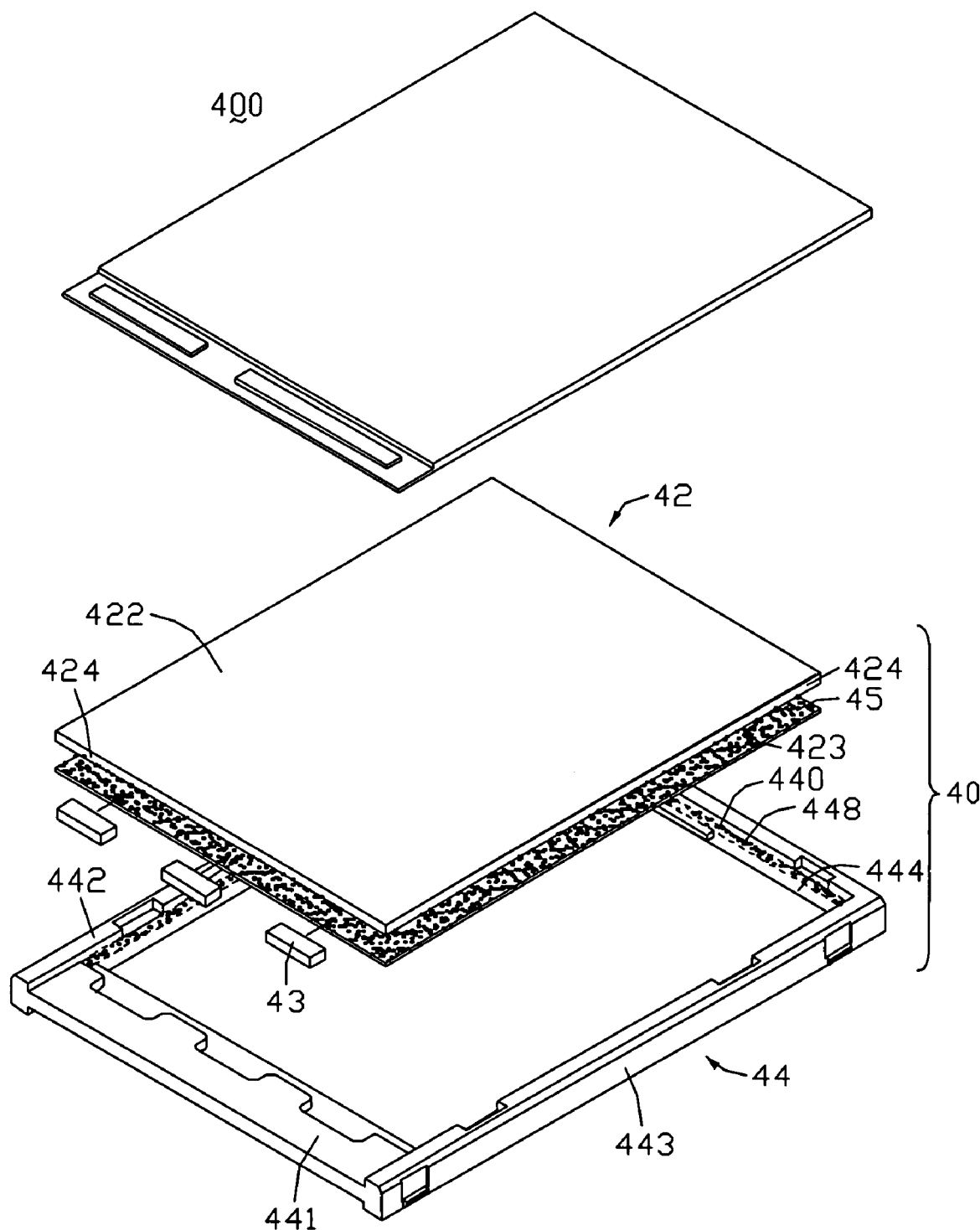
FIG. 4 is an exploded, isometric view of a liquid crystal display according to a third embodiment of the present invention.
Figure 5:
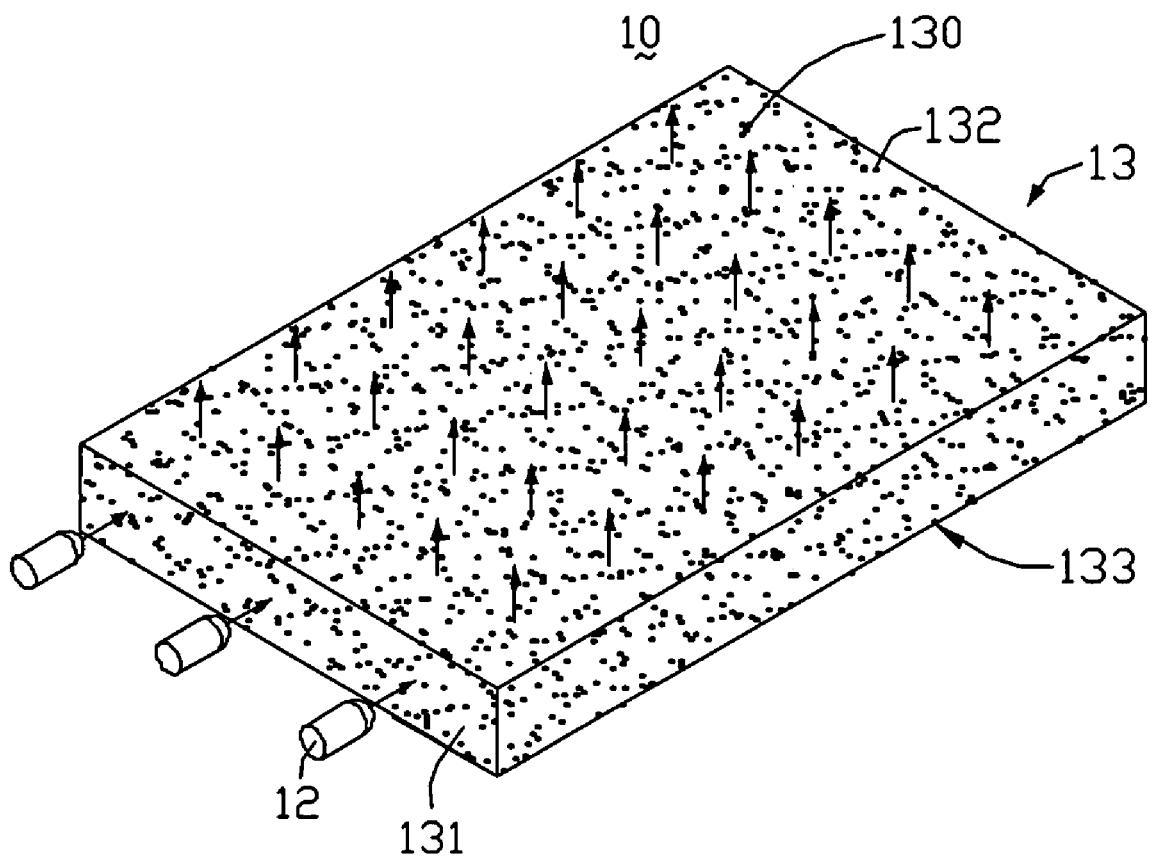
FIG. 5 is an isometric view of a conventional backlight module.

FIG. 4 is an exploded, isometric view of an LCD 400 according to a third embodiment of the present invention. The LCD 400 is similar to the above-described LCD 200. However, the LCD 400 includes a liquid crystal panel 49 and a backlight module 40. The backlight module 40 includes an LGP 42, a frame 44, three light sources 43, and a reflector 45. The LGP 42 includes a top light emitting surface 422, a bottom surface 423, and four side surfaces 424. One of the side surfaces 424 functions as a light incident surface.

The frame 44 includes a first sidewall 441, a second sidewall 444 opposite to the first sidewall 441, a third sidewall 442 adjacent to the first sidewall 441 and the second sidewall 444, and a fourth sidewall 443 opposite to the third sidewall 442. The first sidewall 441, the third sidewall 442, the second sidewall 444, and the fourth sidewall 443 are arranged end-to-end to cooperatively form a four-sided closed structure. Inner surfaces of the second sidewall 444, the third sidewall 442, and the fourth sidewall 443 all include a respective colored reflective layer 440 formed or attached thereon. Each of the colored reflective layers 440 has colored reflective material 448. The structure and function of each colored reflective layer 440 are similar to those of the colored reflective layers 220 of the LGP 22 of the LCD 200. The reflector 45 includes a colored reflective layer (not labeled) coated on a top surface thereof. The colored reflective layer includes colored reflective material 448. In an alternative embodiment, the reflector 45 can instead include colored reflective material 448 embedded therein.

In assembly, the reflector 45 is lowered down and arranged in the frame 44. Then the LGP 42 is lowered down and contained in the frame 44, so that the bottom surface 423 abuts the reflector 45, the light incident surface 424 faces the first sidewall 441, and the other three side surfaces 424 face the second sidewall 444, the third sidewall 442, and the fourth sidewall 443 respectively. The light sources 43 are then lowered down and contained in the frame 44, so that the light sources 43 are adjacent to the light incident surface 424 of the LGP 42. The liquid crystal panel 49 is lowered down and positioned on the assembled backlight module 40.

Light beams emitting from the light sources 43 are transmitted to the LGP 42. Some of the light beams are transmitted to the colored reflective layers 440 of the frame 44 via the side surfaces 424 of the LGP 42, some of the light beams are transmitted to the reflector 45 via the bottom surface 423 of the LGP 42, so as to generate reflected light beams. The reflected light beams are then mixed with the light beams that are not reflected, and white light beams having high purity are generated. The white light beams further emit from the light emitting surface 422, and enable the LCD 400 to display high quality images.

Furthermore, according to light beam mixing principles, in the LCDs 200, 300, and 400, if the light beams emitting from the light sources 23, 33, and 43 are in other color systems, the colored reflective material 228, 360, and 448 can be substituted by other material accordingly. For example, if the light beams emitting from the light sources 23, 33, and 43 are white-bluish, the colored reflective material 228, 360, and 448 can be yellow pigment, so as to generate mixed light beams having high purity. In addition, the colored reflective material can be disposed in another element of the liquid crystal panel, such as in a polarizer (not shown); or even disposed in other thin films of the backlight module, such as in a brightness enhancement film (BEF) or a diffuser, and the backlight module can be either direct type or side-edge type.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present invention to the full extent indicated by the broad general meaning of the terms in which the appended claims are expressed.

What is claimed is:

1. A backlight module, comprising:
    a light guide plate comprising a light incident surface and a light emitting surface;
    a plurality of light sources adjacent to the light incident surface;
    a frame configured to receive the light sources and the light guide plate; and
    a colored reflective structure disposed in the frame, being made of colored reflective material that generates reflected light beams having corresponding color according to the light beams it receives, a density of the colored reflective material progressively decreasing with an increase in distance between the colored reflective material and the light incident surface of the light guide plate;
    wherein some of the light beams emitting from the light sources transmit through the light guide plate to the colored reflective structure and converted to reflected light beams having a corresponding color, the reflected light beams mix with other unreflected light beams in the light guide plate and generate mixed light beams having a desired color, and the mixed light beams emit from the light emitting surface.

2. The backlight module as claimed in claim 1, wherein the colored reflective structure is a colored reflective layer disposed on the surface of the light guide plate.

3. The backlight module as claimed in claim 2, wherein the light guide plate further comprises a first side surface and a second side surface both adjacent to the light incident surface, the colored reflective layer is disposed on the first arid second side surfaces.

4. The backlight module as claimed in claim 3, wherein the light guide plate further comprises a third side surface opposite to the light incident surface, the colored reflective layer is disposed on the third side surface.

5. The backlight module as claimed in claim 1, wherein the colored reflective structure is a colored reflective layer disposed on the inner surface of the frame.

6. The backlight module as claimed in claim 5, wherein the frame comprises a plurality of sidewalls arranged end-to-end, and the colored reflective layer is disposed on an inner surface of at least one of the sidewalls.

7. The backlight module as claimed in claim 1, wherein the colored reflective structure is a colored reflective film.

8. The backlight module as claimed in claim 1, wherein the colored reflective material comprises blue pigment.

9. The backlight module as claimed in claim 1, wherein the colored reflective material is painted in position in the backlight module.

10. The backlight module as claimed in claim 1, wherein the light beams emitting from the light source arc white-yellowish light beams.

11. The backlight module as claimed in claim 10, wherein the reflected light beams are blue light beans.

12. The backlight module as claimed in claim 1, further comprising a reflector having colored reflective material thereon, wherein the reflector is disposed under the light guide plate.

13. A backlight module, comprising:
a light guide plate comprising a light incident surface and a light emitting surface;
a plurality of light sources adjacent to the light incident surface;
a frame configured to receive the light sources and the light guide plate; and
a colored reflective structure disposed in the frame, being made of colored reflective material that generates reflected light beams having corresponding color according to the light beams it receives, at least one of the thickness, the reflectivity, and the colorizing ability of the colored reflective material progressively decreases with an increase in distance between the colored reflective material and the light incident surface of the light guide plate;
wherein some of the light beams emitting from the light sources transmit through the light guide plate to the colored reflective structure and converted to reflected light beams having a corresponding color, the reflected light beams mix with other unreflected light beams in the light guide plate and generate mixed light beams having a desired color, and the mixed light beams emit from the light emitting surface.

* * * * *